United States Patent [19]
Gullichsen et al.

[11] 3,976,538
[45] Aug. 24, 1976

[54] METHOD FOR BLEACHING OF CELLULOSIC PULP

[75] Inventors: Johan E. Gullichsen, Helsingfors, Finland; Rolf G. Ekholm, Karlstad, Sweden

[73] Assignee: Kamyr Aktiebolag, Karlstad, Sweden

[22] Filed: Feb. 24, 1976

[21] Appl. No.: 660,788

Related U.S. Application Data

[60] Continuation of Ser. No. 457,348, April 2, 1974, abandoned, which is a division of Ser. No. 222,230, Jan. 31, 1972, Pat. No. 3,815,386.

[30] Foreign Application Priority Data

Feb. 2, 1971   Sweden.............................. 1246/71

[52] U.S. Cl..................................... 162/17; 8/107; 8/108 R; 8/108 A; 68/181 R; 162/87
[51] Int. Cl.²........................................ D21C 9/10
[58] Field of Search .................. 162/17, 19, 52, 87, 162/88; 8/107, 108 R, 108 A; 68/181 R, 19, 207

[56] References Cited
UNITED STATES PATENTS

| | | | |
|---|---|---|---|
| 2,307,137 | 1/1943 | Kennedy .............................. | 162/17 |
| 3,348,390 | 10/1967 | Richter .............................. | 68/181 R |
| 3,524,551 | 8/1970 | Richter .............................. | 68/181 R X |
| 3,575,795 | 4/1971 | Brinkley et al. ...................... | 162/19 |
| 3,599,449 | 8/1971 | Richter .............................. | 68/181 R |

*Primary Examiner*—S. Leon Bashore
*Assistant Examiner*—Arthur L. Corbin
*Attorney, Agent, or Firm*—Cushman, Darby & Cushman

[57] ABSTRACT

A first portion of bleaching liquid is passed through cellulosic pulp in a bleaching zone at a first level with respect to the pulp feed direction and withdrawn through transversely spaced strainer means located at about said first level so that the passage of the first portion of bleaching liquid through the pulp is in a direction transverse to the feed direction of the pulp and a second portion of bleaching liquid is passed through said cellulosic pulp at a second level with respect to the pulp feed direction and withdrawn through transversely spaced strainer means located at about the second level so that the passage of the second portion of bleaching liquid through the pulp is in a direction transverse to the feed direction of the pulp and opposite from the transverse direction through said first level.

4 Claims, 1 Drawing Figure

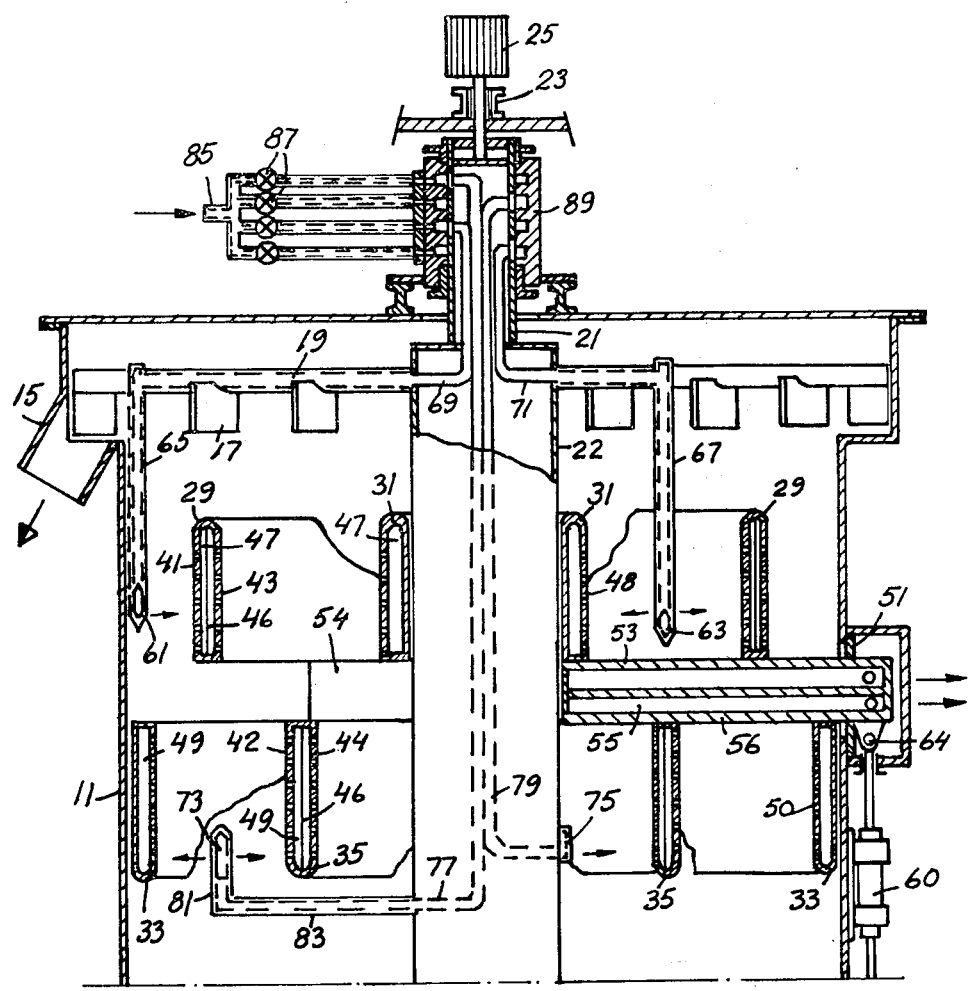

METHOD FOR BLEACHING OF CELLULOSIC PULP

This is a continuation of application Ser. No. 457,348, filed Apr. 2, 1974, now abandoned, which is a division of Ser. No. 222,230, filed Jan. 31, 1972, now U.S. Pat. No. 3,815,386.

In order to accelerate the bleaching of cellulosic pulp it has proved advantageous to bring the bleaching agent to move relatively to the pulp during the bleaching reaction proper. Thereby the reaction products are displaced and new amounts of bleaching agents reach the separate fibers of the pulp, thereby maintaining a high reaction rate.

When such, so called "dynamic" bleaching is effected upon pulp which is fed continuously or stepwise in a certain direction and when the bleaching agent is forced through the pulp transversely to the direction of feed of the pulp, certain drawbacks appear which the present invention has for its object to eliminate.

Said drawbacks are connected therewith that the bleaching agent is gradually spent or weakened during its transverse passage through the pulp flow involving that the side of the pulp flow where the bleaching agent is introduced therein will be treated by bleaching agent of a higher concentration than the opposite side of the pulp flow where liquid is withdrawn therefrom. Accordingly, the bleaching effect will be unevenly distributed over the cross-section of the pulp flow.

According to the invention said drawback is counteracted by the bleaching agent being forced through the pulp flow first in a certain transverse direction and then in another transverse direction, preferably a direction opposite to the first-mentioned direction. In this manner, equalization will take place on account of the transverse flow of bleaching agent changing its direction and different parts of the pulp will successively become the spots where the supplied bleaching agent is of its highest concentration and effects its strongest action. A portion of the pulp from which during a certain stage a more or less inactive liquid is withdrawn, therefore during a later stage will be treated by bleaching agent just supplied and having a strong bleaching action.

When the invention is applied to bleaching of pulp which in a cylindrical upright bleaching vessel forms a vertically progressing cylindrical column, the transverse currents of bleaching agent are directed essentially radially and the directions at different levels of the pulp column are made opposite to each other, so that the moving pulp column after having been subjected at a certain level to a transverse current of bleaching agent directed radially inwardly, will later and at another level be subjected to a transverse current of bleaching agent which is directed radially outwardly, or vice versa.

The invention also relates to a device for the performance of the above-mentioned method in an upright cylindrical vessel, in which cellulosic pulp is fed continuously or stepwise in the axial direction and which is provided with outlet orifices for supply of bleaching agent and with strainers placed at approximately the same level as said orifices and serving for withdrawal of liquid displaced by the bleaching agent supplied. Said device is essentially characterized in that the outlet orifices and the pertaining strainers at the various levels are offset axially relatively to each other in such a manner that the vertically moving pulp column is penetrated in succession by essentially horizontal bleaching agent currents of mutually different directions. Further characterizing feature of the device preferably applied when performing the method in a known vessel with strainers, is stated in the following patent claims.

An embodiment of a bleaching vessel equipped with the device according to the invention is shown diagrammatically and as a vertical cross-sectional view in the accompanying drawing.

The shown bleaching vessel forms a vertically standing tower with a cylindrical shell 11. Cellulosic pulp is charged continuously or as small batches into the lower end (not shown) of the tower, so that the pulp is caused to move as a coherent column upwardly through the vessel with a speed which is as uniform as possible over the cross-section. Arranged at the upper end of the vessel is a discharging device which diverts the rising pulp out through a lateral pulp outlet 15. Said discharging device may consist of a scraper composed of obliquely set plates 17 carried by radial arms 19. Said arms are attached to a tube located centrally in the vessel and forming a hollow core 22 which is connected to a rotary vertical shaft 21. At its upper end outside the vessel said shaft is journalled in a bearing 23 and driven by a motor 25. Preferably the vessel is closed so that it can be held under over-pressure.

Provided in the vessel is a strainer device composed of two sets of strainer bodies, viz. an upper set consisting of two annular strainer bodies 29, 31 concentric to each other and to the axis of the vessel, and a lower set comprising two annular strainer bodies 33, 35 which likewise are concentric to each other and to the axis of the vessel. The strainer bodies 29, 35 each consist of two substantially cylindrical strainer plates 41, 43 and 42, 44, respectively, of slightly different diameters inserted into each other and having their upper and lower edges united. A cylindrical partition 46 may be inserted in the strainer bodies between the strainer plates. The strainer plates 41, 43, 42, 44 are generally vertical everywhere and are provided with perforation apertures or vertically extending strainer slits distributed over essentially their entire face. The remaining strainer bodies 31, 35 located close to the central core 22 of the vessel and close to its shell 11, respectively, are designed essentially in the same manner as the strainer bodies 29, 35 but are provided with strainer apertures or slits merely on the cylindrical face 48 and 50, respectively, that is facing the pulp moving past the same. Liquid withdrawn from the pulp penetrates into cavities 47, 49 within the strainer bodies. The strainer bodies of the two sets are rigidly connected to horizontally and radially extending carrying arms 54, 56. The outer ends of said arms extend through slots in the vessel shell 11. Said slots extend in the vertical direction sufficiently far for allowing a restricted reciprocating movement of the carrying arms in the axial direction of the vessel. Plates 51 attached to the carrying arms cover said slots in order to reduce the leakage therethrough. The carrying arms are provided with interior passages 53, 55 for conveying the liquid withdrawn by the strainer bodies to exterior discharge conduits. The upper passages 53 of the carrying arms communicate with the cavities 47 of the strainer bodies 29, 31 of the upper set, and the lower passages 55 communicate with the cavities 49 of the strainer bodies 33, 35 of the lower set. The strainer bodies are moved vertically in one and/or the other direction by an operating device located outside the vessel and arranged to act upon the outwardly extending ends of the carrying arms 54, 56. Thus, for each carrying arm there is attached to the outside of the vessel a hydraulic or pneumatic cylinder 60 having a vertical piston connected to an attachment 64 upon the end of the carrying arm.

The two sets of strainer bodies have different diameter measurements of their strainer bodies. Thus the strainer body 33 is of greater diameter than the strainer body 29, and the strainer body 35 is of greater diameter than the strainer body 31. Further the strainer body 35 is of a diameter which is intermediate and preferably differs equally much from the diameter measurements of the strainer bodies 29, 31 and the strainer body 29 is of a diameter which is intermediate and preferably differs equally much from the diameter measurements of the strainer bodies 33 and 35. If the number of strainer bodies of each set is increased to three or more, the same applies to the added strainer bodies, viz. no strainer body of one set shall be of the same diameter as any strainer body of the other set. If the strainer bodies are considered in the order of increasing diameters, every second will be found in the upper set and every second inbetween in the lower set. The diameter measurements form a series the members of which show successive, preferably equally great increments, i.e. the strainer bodies of one set should be of diameters that differ equally much from the diameter measurements of the next greater and the next smaller strainer body of the other set. This applies to all strainer bodies except the greatest 33 which is situated close up to the shell of the vessel, and except the smallest 31 which is situated close up to the central core 22 of the vessel. In each strainer set the strainer bodies are located at the same level, but the two sets are mutually offset in the axial direction. Thus, the upper edges of the strainer bodies 33, 35 of the lower set are located in one or the same horizontal plane, and said horizontal plane preferably is situated somewhat lower than the horizontal plane extending through the lower edges of the strainer bodies of the upper set.

The device according to the invention also comprises a system of bleaching agent supply conduits provided with bleaching agent outlets located at the same levels as the strainer body sets. To each set of strainer bodies there belongs a group of outlets provided in a number equal to the number of strainer faces of said set of strainer bodies, and said outlets are located within the range of levels covered by the corresponding strainer faces, preferably in the lower part of said range. Thus, to the upper set of strainer bodies there belong outlet orifices 61, 63 placed upon the lower ends of vertical tubes 65, 67 attached to the scraper arms 19 and extending vertically therefrom, said tubes being connected to supply conduits 69, 71 respectively. When the scraper arms are turned, said outlet orifices move in circular paths concentric to the strainer faces and to the central core 22. The tube 65 is situated straight above the outermost strainer body 33 of the lower set of strainer bodies and close to the vessel shell 11, and its outlet orifice 61 describes a circular path concentric to the strainer bodies and of approximately the same radius as the strainer body 33. The tube 67 with outlet orifice 63 is located straight above the strainer body 35 and moves in a path of the same radius as said strainer body. Preferably the outlet orifices are extended in the vertical direction so that the liquid ejected therefrom is spread as a cylindrical film. However, the extension in the height direction of said film is usually less than that of the strainer bodies. From said cylindrical distributing face the liquid flows in essentially horizontal and radial paths through the pulp towards the opposite strainer face, thereby displacing the liquid previously forming part of the pulp and expelling a corresponding amount of liquid through the respective strainer face. Thus, from the immaterial cylindrical face to which bleaching liquid is supplied by the outlet orifice 61, a flow which is evenly distributed over the circumference runs radially inwards towards the strainer face 41, and through said strainer face there departs liquid containing spent or residual bleaching agent and reaction products. Usually the amounts of supplied liquid and withdrawn liquid correspond to each other, but a certain controlled difference between said amounts may be maintained whereby the pulp is thickened or diluted during its passage upwardly past said strainer face. The bleaching agent ejected from the outlet orifice 63 is likewise spread over an imaginary cylindrical surface in the pulp. Said amount of bleaching agent is divided and flows in part radially inwards towards the strainer face of the strainer body 31 and in part radially outwards towards the strainer face 43 of the strainer body 29.

To the lower set of strainer bodies there belong outlet orifices 73, 75 which are connected to conduits 77 and 79 for the supply of bleaching agent, which conduits extend within the core 22. The outlet orifice 73 is provided on the upper end of a vertical tube 81 situated straight below the strainer body 41 and connected to the rotary core 22 by means of a tube 83 extending horizontally and radially below the lower set of strainer bodies. Thus, from the outlet 73 bleaching agent is spread over a cylindrical face of the same radius as the strainer body 29. The outlet 75 is situated close to the core 22 and when the core is turned, said outlet distributes bleaching agent over a cylindrical face of the same radius as the strainer body 31.

By the strainer bodies the pulp which flows axially upwards in the vessel as a coherent column, is divided up into three concentric part flows each having the cross-section of an annulus. The innermost of said part pulp flows which passes between the core 22 and the strainer body 35 is treated first by the bleaching liquid which from the outlet 75 is forced transversely through the pulp column towards the strainer face 44 of the strainer body 35, through which face a corresponding amount of displaced liquid is drawn out of the pulp. The concentration of the bleaching agent which is highest at the outlet 75, decreases according as the bleaching agent penetrates farther out and is used up by the reaction. Accordingly, the bleachng reaction will be unevenly distributed over the cross-section of the pulp and will be considerably weaker at the outer portions of the part pulp flow under consideration. According to the invention said inconvenience is compensated thereby that said pulp flow, when it reaches the level of the upper set of strainer bodies, is penetrated by a transverse current of bleaching liquid which emanates from the outlet orifice 63 and thus will be most effective upon the radially outer portion of said part flow of pulp.

In a similar manner the part flow of pulp which passes between the strainer bodies 35 and 29 will be treated first with bleaching liquid which from the outlet 73 is forced radially inwards towards the strainer face 42, and at a later stage with bleaching agent which from the outlet 63 is forced radially outwards towards the strainer face 43. Finally, the outermost part flow of pulp which passes between the strainer body 29 and the shell 11 will be treated first with bleaching liquid which from the outlet 73 is forced radially outwards towards the strainer face 50 and then with bleaching liquid which from the outlet 61 is driven radially inwards towards the strainer face 41.

The used bleaching agent which may be of any kind and e.g. consists of a water solution of chlorine, chlorine dioxide or hypochlorite, is supplied through a conduit 85 and is distributed by means of valves 87 in proper proportions upon conduits which are connected over a stuffing box 89 each with a separate one of the rotary conduits 69, 71, 77, 79 in the core 22.

In the shown embodiment the bleached pulp is discharged through the outlet 15 together with bleaching reaction products and possibly residual bleaching agent. However, it may be advantageous to perform a washing operation of the pulp already in the vessel 11, and to this end there may be interposed between the uppermost set of strainer bodies 29, 31 and the scrapers 17 a washing device likewise consisting of concentric strainer rings and nozzles for spreading water or other wash liquid, said nozzles being moveable between said strainer rings, e.g. a wash device of the kind shown in the Swedish Pat. No. 225,814.

On account of the bleaching liquid moving relatively to the fibers of the pulp, the required time of the bleachng operation will be reduced and a desired bleaching stage will be completed during a comparatively short axial movement of the pulp through the vessel. Due thereto it is possible with bleaching towers of conventional heights to perform several successive bleaching stages in one and the same tower. Then one or more further double sets of strainer bodies and liquid spreaders of the same design as above described and shown in the drawing are arranged therebelow. If desired, the bleaching stages or one or more of them may be followed by a washing zone comprising concentric strainer bodies. The operating device 60 may be common to all strainer bodies of said bleaching and washing stages. However, in certain cases the device may function satisfactorily even if the strainer bodies remain stationary. The latter applies particularly if the pulp is fed stepwise and the pressure difference over the strainer faces is shut off during the advancement of the pulp.

Of course, the above described embodiment may be modified as to its details and the invention may be applied also to bleaching plants of a completely different design.

What is claimed is:

1. In a method of bleaching of cellulosic pulp including the steps of essentially continuously feeding the pulp through a bleaching zone in a straight path and passing a bleaching liquid through the pulp in a direction transverse to the feed direction of the pulp, the improvement in said liquid passing step which consists essentially of the steps of feeding a first portion of bleaching liquid into said zone at a first level with respect to the direction of pulp feed and withdrawing liquid displaced through transversely spaced strainer means located at about said first level so that the passage of the first portion of bleaching liquid through all parts of the pulp flowing along said straight path within said zone through said first level is in a direction transverse to the feed direction of the pulp and feeding a second portion of bleaching liquid into said zone at a second level with respect to the direction of pulp feed and withdrawing liquid displaced through transversely spaced strainer means located at about the second level so that the passage of the second portion of bleaching liquid through all parts of said pulp flowing along said straight path within said zone through said second level is in a direction transverse to the feed direction of the pulp and opposite from the transverse direction through said first level.

2. A method of bleaching of cellulosic pulp as defined in claim 1 wherein the pulp fed to said bleaching zone is peripherally confined along a vertically extending cylindrical plane during flow therethrough and wherein the opposite transverse directions of bleaching liquid passage are radial with respect to said cylindrical plane.

3. A method of bleaching cellulosic pulp as defined in claim 2 wherein the bleaching liquid is fed at each of said levels at at least two locations.

4. A method of bleaching cellulosic pulp as defined in claim 3 wherein the location of bleaching liquid feed in each level is moved rotationally about the axis of the aforesaid cylindrical plane.

* * * * *